United States Patent [19] | [11] 3,804,979
Knowles | [45] Apr. 16, 1974

[54] DETECTION DEVICES FOR IMAGE ANALYSIS SYSTEMS

[76] Inventor: William Ralph Knowles, 40 Flambards Close, Meldreth, England

[22] Filed: Oct. 27, 1971

[21] Appl. No.: 192,831

[30] Foreign Application Priority Data
Oct. 29, 1970 Great Britain .................... 53405/70

[52] U.S. Cl. .................. 178/7.1, 307/235, 328/146, 328/147
[51] Int. Cl. .............................................. H04n 5/14
[58] Field of Search ............... 178/7.1, 7.2, DIG. 26, 178/DIG. 39; 328/147, 146, 149, 150, 115–117; 307/235, 235 A

[56] References Cited
UNITED STATES PATENTS

| | | | |
|---|---|---|---|
| 2,885,551 | 5/1959 | Greanias | 328/146 |
| 3,590,811 | 7/1971 | Harris | 328/147 |
| 2,833,957 | 5/1958 | Horowitz | 178/7.2 |
| 2,855,513 | 10/1958 | Hamburgen et al. | 178/DIG. 26 |
| 2,795,705 | 6/1957 | Rabinow | 178/7.2 |
| 3,599,105 | 8/1971 | Weir et al. | 328/146 |
| 3,115,545 | 12/1963 | Gebel | 178/6.8 |
| 3,566,281 | 2/1971 | Baumann | 307/235 |

*Primary Examiner*—Robert L. Griffin
*Assistant Examiner*—Joseph A. Orsino, Jr.
*Attorney, Agent, or Firm*—Browne, Beveridge, DeGrandi & Kline

[57] ABSTRACT

The invention concerns detection devices for image analysis systems in which an amplitude modulated video signal is obtained by line scanning. A two value signal is obtained by comparing the instantaneous amplitude of the video signal with a reference voltage so that the detector output comprises an electrical pulse each time the amplitude e.g. exceeds the reference voltage. The duration of each pulse is equal to the duration of the excess amplitude excursion.

1 Claim, 7 Drawing Figures

DETECTION DEVICES FOR IMAGE ANALYSIS SYSTEMS

Figure 1:
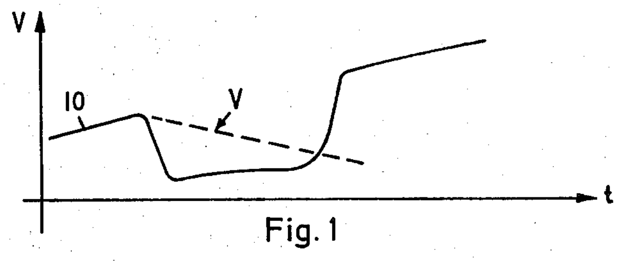

The invention provides that the value of the reference voltage be determined by the local peak amplitude of the video signal so that the value of the reference voltage follows any general trends in the response of the source of video signal. In this way inaccuracies caused by shading distortion can be largely eliminated.

In one embodiment the reference voltage is derived from the same signal as is supplied to the comparator.

In another embodiment the video signal supplied to the comparator is delayed relative to that from which the reference voltage is derived.

In a further embodiment in which the video signal is delayed before being applied to the comparator, the video signal and delayed video signal are both supplied to the reference voltage generator.

The delay may be made equal to the rise time of the reference voltage generator.

A modification is also described by which the decay characteristic of the reference voltage generator is adjustable to produce a very slowly decaying voltage for the duration of an excess amplitude excursion.

This invention concerns electrical circuits for threshold detecting an amplitude modulated video signal obtained by scanning a field or an image thereof containing regions of differing light reflection or transmission properties from their surroundings. Such regions are referred to as features.

Where a video signal is obtained by scanning a dark feature on a light grey background, the amplitude of the signal will typically have a high value for the background and a low value for the feature and, by comparing the instantaneous video signal amplitude with a constant threshold voltage, a second binary type signal (usually referred to as detected video signal) may be obtained by switching a bistable device into its one state when the amplitude is less than the threshold (i.e., equals feature) and its zero state when the amplitude is greater than the threshold (i.e., equals background).

Unfortunately, due to a non-uniformity of most sources of scanned video signal, usually called shading, the amplitude of the video signal for a particular grey level will be different depending on where the grey region is situated in the field. The shading pattern of most sources is such that this amplitude will be greatest in the centre of the field and smallest near the edges.

It is known to partially compensate for this shading by applying parabolic correcting voltages throughout each line scan and over the complete frame scan, thereby to reduce the differences in amplitude of the field, but such corrections can only be approximate.

Although the maximum black level video signal amplitude can be considered to be substantially constant, the peak white level will vary over the field with the shading pattern. Thus, if the threshold voltage is constant, it is possible that a value set to detect grey features in the centre of the field will cause detection of a light grey background near the edges of the field.

According to the present invention the value of the threshold voltage for a detection device is determined at least in part from the instantaneous peak white amplitude value of the video signal so that it varies in sympathy with the source shading characteristics. Thus if the threshold voltage is set to detect all amplitude levels less than 50 percent of peak white at any point in the field, it will do so irrespective of the actual value of the peak white at any point.

A detection device for an image analysis system embodying the invention comprises an input for an amplitude modulated video signal, a peak rectifying circuit for deriving a reference voltage from the instantaneous amplitude of the video signal voltage comparator means for comparing the instantaneous amplitude of the video signal with the reference voltage and generating a two-value signal having one value when the amplitude exceeds and the other value when the amplitude is less than the reference voltage.

The present invention also provides that a delay device be inserted between said input and said comparator whereby the video signal supplied to the comparator is delayed relative to that supplied to the peak rectifying circuit.

The invention further provides that the peak rectifying circuit be supplied with the video signal both from the input and the delay device, whereby the reference voltage at any instant is dependent on the higher of the two signals supplied thereto.

It is to be understood that the terms "peak", "high" and "higher" are not limited to positive going amplitude excursions but include either positive going amplitude modulation or negative going amplitude modulation.

Figure 2:
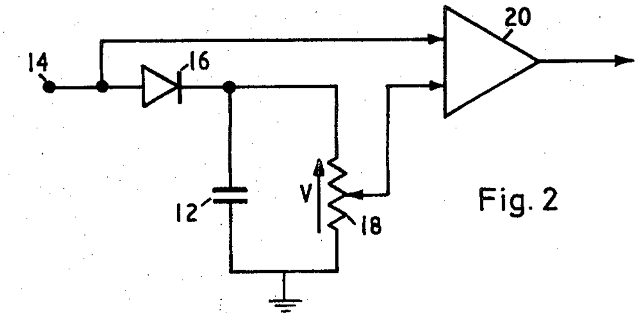
Figure 3:
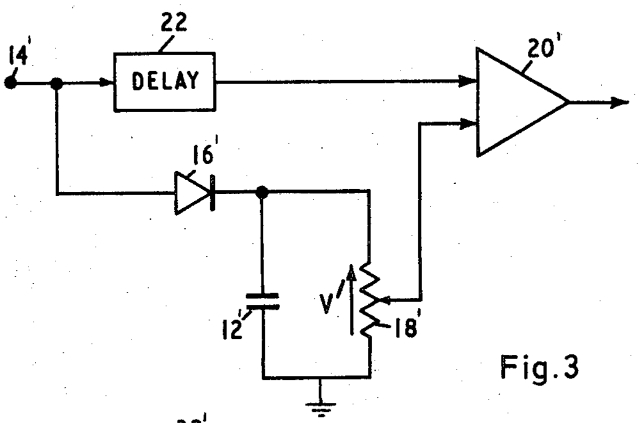
Figure 4:
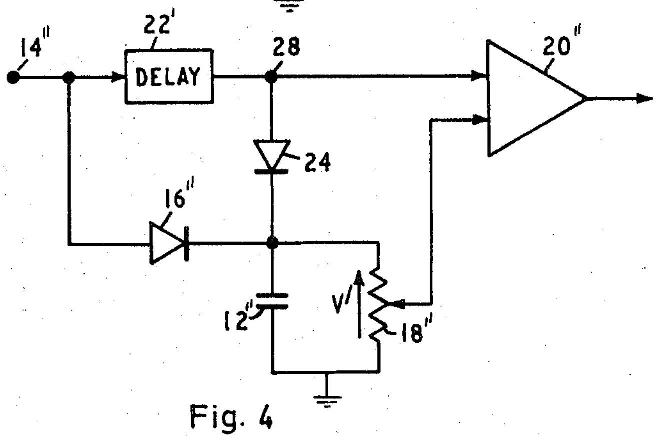
Figure 5:
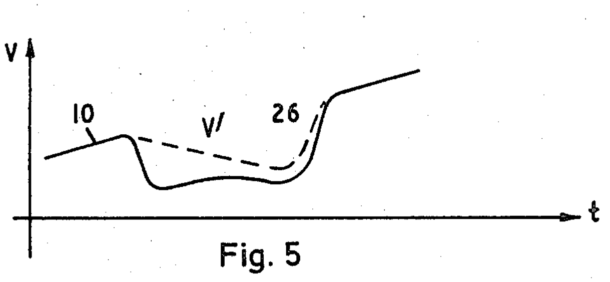
Figure 6:
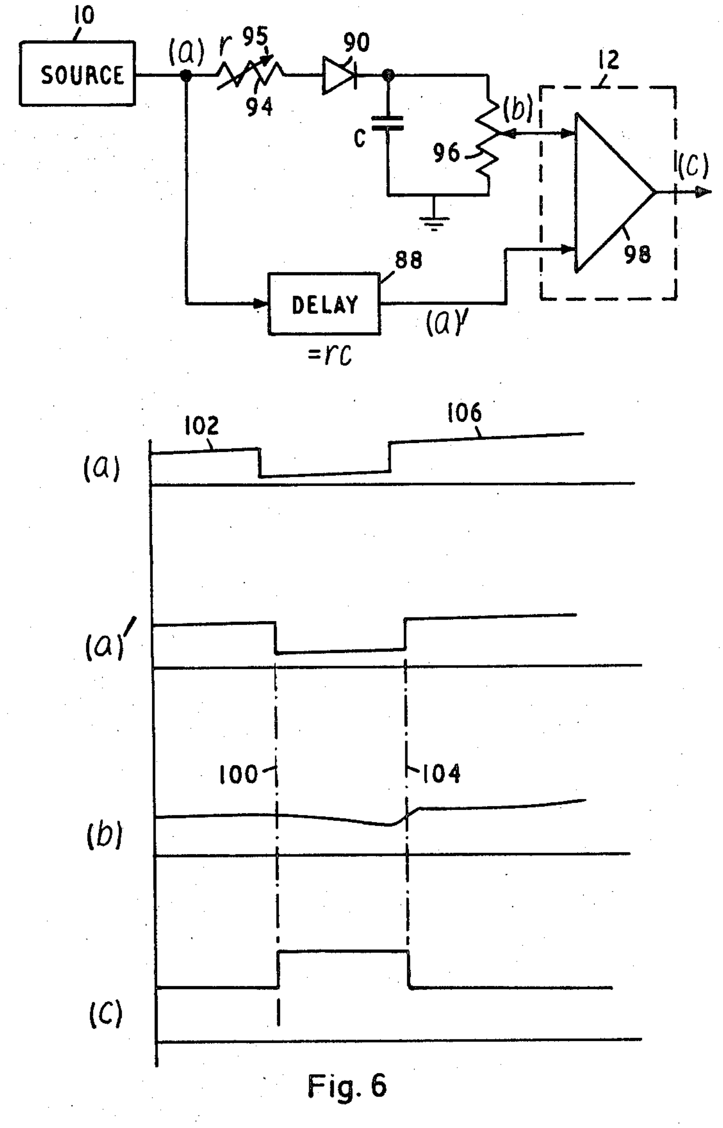
Figure 7:
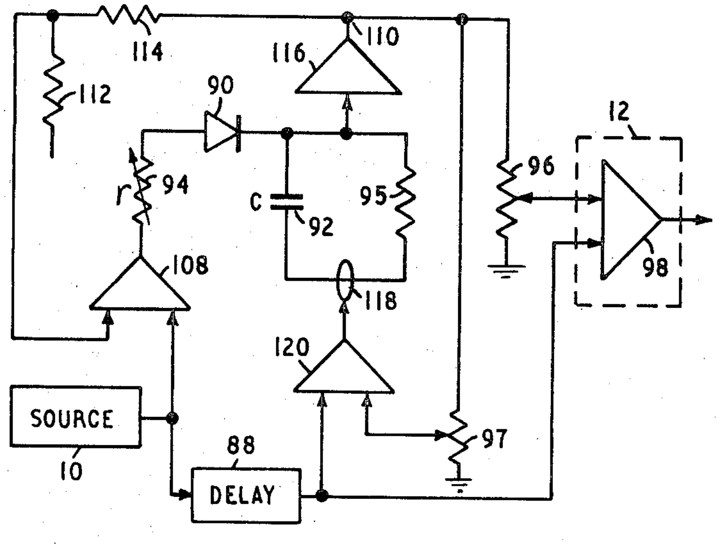
Figure 7:
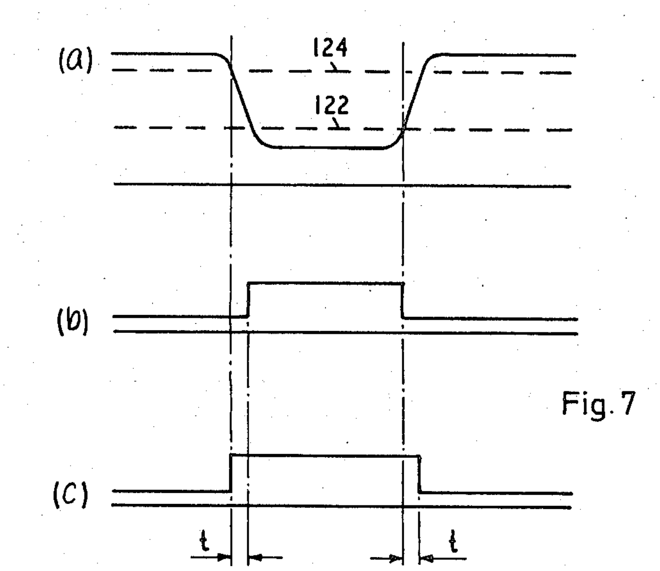

The invention will now be described by way of example with reference to the accompanying drawings, in which:

FIG. 1 illustrates graphically a video signal amplitude variation due to a dark feature on a white background, from a source subject to shading error, FIG. 2 is a block circuit diagram of a detection device embodying the invention, FIG. 3 is a block circuit diagram of another embodiment of the invention, FIG. 4 is a block circuit diagram of a further embodiment of the invention, FIG. 5 illustrates graphically the same amplitude variation as FIG. 1 with superimposed thereon the reference voltage derived by the reference voltage generator employed in FIG. 3, FIG. 6 is a particular refinement of the circuit of FIG. 2 together with graphical representations of signal waveform obtained therefrom in FIGS. *6a* to *6c*, and FIG. 7 is a further refinement together with graphical voltage waveform representations in FIGS. *7a* to *7c*.

Due to shading the peak white level of the video signal 10 in FIG. 1 rises with distance over the first half of any line scan and, although not shown, drops with distance in the second half. Whilst scanning the white background the voltage across capacitor 12 of FIG. 2 will follow the rising peak voltage 10 of FIG. 1 (if the video signal is applied to junction 14) due to the action of rectifier 16. However if the video signal suddenly falls due to the presence of a feature the capacitor will no longer charge up but will discharge through load resistor 18. This may be a potentiometer at whose tapping a fixed percentage of the total voltage will be obtained. This can thus be used as a reference/voltage for a comparator 20 acting as a threshold detector, to whose other input is applied the video signal 10.

Due to the discharge whilst scanning the feature the voltage V across resistor 18 will drop during the feature and this is shown by the dotted line V in FIG. 1

An improvement is obtained by delaying the video signal from junction 14' in a delay device 22 as shown in FIG. 3.

A further improvement is obtainable by connecting a second rectifying diode 24 between the junction 28 and the capacitor 12' as shown in FIG. 4. Since the remainder of the circuit of FIG. 4 is correspondingly primed as FIG. 2 and FIG. 3 the same reference numerals have been employed. The presence of the second diode 24 means that the reference voltage is not only derived from the amplitude of the signal at 14' but also that appearing at junction 28.

The resulting effect is illustrated in FIG. 5 where towards the end of a feature the voltage V' across 18 will rise (as denoted by the curve 26) prior to the rise in amplitude in the delayed video signal appearing at junction 28.

The phrase "peak rectifying circuit" is intended to mean any circuit containing a charge storage device such as a capacitor and having an assymetrical charge-discharge characteristic i.e., the charging time constant is less than the discharging time constant. A well known example is a capacitor having a resistive load for determining the discharge characteristic and charged through a non-linear device such as a rectifying diode connected such that its low forward resistance controls the charging current for the capacitor and its high reverse resistance forces the capacitor to discharge through the load.

FIG. 6 illustrates a refinement of the circuit of FIG. 3. To this end the video output from a source 10 is supplied to a comparator 12 via a delay device 88 such as a delay line. At the same time the video signal is passed through a peak rectifying circuit comprising a rectifying diode 90 and peak voltage capacitor 92 whose capacitance is designated C. The forward charging resistance of the circuit is designated by a series resistance 94 whose ohmic resistance is given by *r*. The ohmic resistance *r* is variable by control 95 to vary the charging rate for capacitor 92. The peak voltage is developed across a potentiometer 96 connected in parallel with the capacitor 92 and the tapping of the potentiometer supplies the second input to the comparator 98 forming part of the detector 12. The voltage at the tapping of the potentiometer 96 serves as a reference threshold voltage with which the instantaneous value of the video signal can be compared.

The resistance of potentiometer 96 is made large compared with the resistance *r* of resistor 94 so that the forward charging time constant of the peak value circuit is approximately given by the product of *r* and C. The time delay introduced by the delay device 88 is made approximately equal to the time constant *rC*.

Changes in the average value of the video signal will appear as changes in the value of the total voltage developed across the potentiometer 96 and proportionate changes will appear in whatever voltage is tapped from the potentiometer. If therefore there is a 15 percent swing in the average value of the video signal from the source 10, a corresponding variation will appear at the tapping of the potentiometer 96. It will be appreciated however that whereas the forward time constant of the charging circuit will be small the discharge time constant will be determined by the product of the resistance of the potentiometer 96 and the capacitor 92. The circuit will therefore present an assymmetrical charge and discharge characteristic which can be used to advantage to prevent the threshold voltage across 96 from following video signal variations corresponding to features.

An idealised video waveform is shown in FIG. 6*a* which corresponds to a single line scan intersecting a single feature in which shading error occurs in the signal and constitutes a rising DC component in the video signal. FIG. 6*a'* shows the same signal delayed in time by a sufficient amount to accommodate the delay introduced by the time constant of the peak value circuit of FIG. 6. FIG. 6*b* illustrates the assymmetric nature of the charging and discharging characteristics of the peak rectifying circuit. Up to the leading edge of the detected video signal (after delay by the delay device 88) and which is identified by reference numeral 100 in FIG. 6*b*, the voltage across capacitor 92 follows closely the rising DC level 102 of FIG. 6*a*. As soon as the source voltage drops below the stored voltage in capacitor 92, diode 90 ceases to conduct and the value of the voltage across 92 begins to decay according to the time constant of the discharge cycle. As previously described this depends on the value of the resistor 96 and is typically very high. Thus the voltage across capacitor 92 decays very slowly. At the trailing edge of the detected feature 104 in FIG. 6*b*, the source voltage once again exceeds the stored voltage in capacitor 92 and the diode 90 begins to conduct to charge capacitor 92 by an increased amount. The voltage across capacitor 92 therefore begins to follow the rising DC level of the signal (106 in FIG. 6*a*). A comparison of FIG. 6*b* and FIG. 6*a* shows quite clearly the advantage of employing the delay device 88 since otherwise the changes produced in the compensated threshold voltage developed across potentiometer 96 and caused by detected video, would occur at an incorrect point in time relative to the detected edges.

FIG. 6*c* illustrates a typical two-state detected video output signal obtainable from the comparator 98.

FIG. 7 illustrates a refinement of the circuit of FIG. 6. Where appropriate the same reference numerals have been used and only those parts of FIG. 7 not common to FIG. 6 will be described.

In order to improve the rise time of the peak value circuit, a differential amplifier 108 is provided between the source output and the input to the peak value circuit. One input of the differential amplifier is provided with the video signal from the source 10 and the other input is provided with a voltage derived from the output from the peak value circuit. In order to allow over-detection, that is a reference voltage which is greater than the, for example, peak white level of a given video signal, a fraction only of the output from the peak value circuit is supplied to the differential amplifier 108, typically 90 percent of the peak value output, so that a voltage is developed at junction 110 which is 10 percent higher than the peak white value, for example, of the video signal. This is achieved by feeding back from junction 110 a voltage to the input of the differential amplifier 108 via a potentiometer formed from two resistors 112 and 114. The ratio of the two resistors may be adjustable or pre-set. It will be appreciated that the same effect can be obtained by providing 100 percent feedback from 110 to amplifier 108 and attenuating the delayed video signal to the comparator 98 by the same amount as is produced by the resistor pairs 112, 114. It will also be appreciated that the improvement in rise time of the circuit will depend to a large extent on the amplification of the differential amplifier 108. The action of the amplifier will be to increase the effect of a very small change (in a charging direction) of the DC level of the video signal relative to the stored charge on capacitor 92.

A further addition to the basic circuit of FIG.6 is the provision of a buffer amplifier 116 between the storage capacitor 92 and the potentiometer 96. This allows matching of the load requirements for the potentiometer 96 with the high impedance peak value circuit. It will be seen that because the potentiometer 96 is no longer directly coupled across the capacitor 92, a separate discharging resistor 95 is provided in place of the potentiometer 96. The provision of the buffer amplifier 116 allows a further advantage to be obtained from the circuit by providing a gate 118 in series with the resistor 95 whereby the resistor may be open-circuited relative to the capacitor 92. By arranging that the gate 118 is open-circuited for the duration of each intersect by line scan with a feature, the droop in the voltage across the capacitor 92 during the detection of large features, can be reduced substantially to zero, since the discharging resistance seen by the capacitor 92 is then the input resistance of the buffer amplifier 116, which can be made very high. To this end a comparator 120 is provided which is fed with two inputs, one from the delayed video signal from the source 10 and the other from a potentiometer 97 similar to potentiometer 96. The potentiometer 97 is set at a level indicative of the grey level of detected features and the output from the comparator 120 is arranged to close the gate 118 when that grey level is reached or exceeded. It will be appreciated that the output from comparator 98 in the detector 12 might be employed thereby eliminating the necessity for a separate comparator 120 and potentiometer 97. However the maximum benefit of the gating of the resistor 95 would not be obtained from such an arrangement and this is illustrated in FIG.7*a*, *b* and *c*. FIG.7*a* illustrates a typical video waveform from a single line scan intersecting a large black feature on a white background. If the threshold level determined by potentiometer 96 is set at the level indicated by the line 122 in FIG.7*a*, the resulting idealised, detected video signal is as shown in FIG.7*b*. If the output from the detector 12 is also employed to gate resistor 95, then this resistor is only open-circuited for the duration of the positive going pulse shown in FIG.7*b*. It will be seen that this is considerably shorter than the actual duration of the video signal pulse corresponding to the black feature. If on the other hand, a separate threshold criterion is applied for obtaining the gating pulses applied to gate 118, most or all of the width of the video signal pulse can be employed and the gate 118 is opened and closed nearer to the actual feature boundaries. Thus, for example, if the threshold criterion set by potentiometer 97 is denoted by the level 124 of FIG.7 *a*, the gate 118 will be closed for the duration of the positive going pulse shown in FIG.7*c* thereby gaining a total increase of $2 \times t$ over the gating time which would be derived from the actual video signal.

I claim:

1. A detection device for an image analysis system in which an amplitude modulated video signal is obtained by line scanning, comprising an input to receive the video signal, a peak rectifying circuit for deriving a reference voltage from the local peak instantaneous amplitude of the video signal, voltage comparator means for comparing the instantaneous amplitude of the video signal with the reference voltage and generating a two-value signal having one value when the amplitude exceeds and the other value when the amplitude is less than the reference voltage, a signal delay means for delaying the video signal a small fraction of a line scan period being connected between said input and said comparator and a rectifying diode being connected between the output of said delay means and said peak rectifying circuits for charging the latter to whichever is the higher of the instantaneous local peak amplitudes of the video signal and the delayed video signal.

* * * * *